US012772340B2

(12) United States Patent
Harel

(10) Patent No.: US 12,772,340 B2
(45) Date of Patent: Oct. 20, 2026

(54) SYSTEMS AND METHODS FOR SPLITTING CELLS IN A NETWORK FOR INTERNET OF THINGS (IOT)

(71) Applicant: ANI Acquisition Sub, LLC, Boca Raton, FL (US)

(72) Inventor: Dror Harel, Hod Hasharon (IL)

(73) Assignee: ANI ACQUISITION SUB, LLC, Boca Raton, FL (US)

( * ) Notice: Subject to any disclaimer, the term of this patent is extended or adjusted under 35 U.S.C. 154(b) by 411 days.

(21) Appl. No.: 18/198,894

(22) Filed: May 18, 2023

(65) Prior Publication Data

US 2023/0300948 A1 Sep. 21, 2023

Related U.S. Application Data

(62) Division of application No. 17/397,526, filed on Aug. 9, 2021, now Pat. No. 11,659,627.

(51) Int. Cl.

| | |
|---|---|
| ***H04W 88/12*** | (2009.01) |
| ***H04B 17/318*** | (2015.01) |
| ***H04W 4/70*** | (2018.01) |
| ***H04W 88/16*** | (2009.01) |

(52) U.S. Cl.
CPC .......... *H04W 88/12* (2013.01); *H04B 17/318* (2015.01); *H04W 4/70* (2018.02); *H04W 88/16* (2013.01)

(58) Field of Classification Search
CPC ....... H04W 88/12; H04W 4/70; H04W 88/16; H04B 17/318
USPC .......................................................... 370/329
See application file for complete search history.

(56) References Cited

U.S. PATENT DOCUMENTS

| | | | | |
|---|---|---|---|---|
| 6,463,279 | B1 | 10/2002 | Sherman et al. | |
| 9,338,591 | B1 * | 5/2016 | Vivanco ............ | H04W 36/0088 |
| 9,860,677 | B1 | 1/2018 | Agerstam et al. | |
| 10,750,433 | B1 * | 8/2020 | Shukla .................. | H04W 48/10 |
| 11,941,472 | B1 * | 3/2024 | Mohammad ............ | G06F 1/165 |
| 2001/0006514 | A1 * | 7/2001 | Park ...................... | H04W 36/08 370/342 |
| 2001/0055969 | A1 * | 12/2001 | Bonta ............... | H04W 36/0055 455/437 |
| 2003/0190916 | A1 * | 10/2003 | Celedon ............ | H04W 36/0085 455/437 |
| 2003/0214917 | A1 * | 11/2003 | Molisch ................ | H04L 25/067 370/334 |

(Continued)

FOREIGN PATENT DOCUMENTS

| | | | |
|---|---|---|---|
| WO | 2017/113217 | A1 | 7/2017 |

*Primary Examiner* — Mark G. Pannell
(74) *Attorney, Agent, or Firm* — Greenberg Traurig, LLP; Mammen ("Roy") P. Zachariah

(57) ABSTRACT

Systems and methods for splitting cells in a network of Internet of Things (IOT) may evaluate a network metric such as receives signal strength indicator (RSSI) for end devices to determine a general network activity level. When the network metric falls below a predetermined threshold, the cell splitting controller may cause the cell to split in such a manner as to offload some portion of the end devices on an adjacent gateway and/or change frequencies to reduce the likelihood of collision. By splitting cells in this fashion, the density of end devices served by a single gateway is reduced, fewer collisions occur statistically, and the user experience may be improved.

6 Claims, 14 Drawing Sheets

(56) References Cited

U.S. PATENT DOCUMENTS

| | | | | |
|---|---|---|---|---|
| 2004/0147267 | A1* | 7/2004 | Hill | H04W 64/00 455/456.1 |
| 2007/0049276 | A1* | 3/2007 | Rimoni | H04W 36/1446 455/436 |
| 2007/0064887 | A1* | 3/2007 | Bjorklund | H04W 16/00 379/88.17 |
| 2007/0110098 | A1 | 5/2007 | Hart et al. | |
| 2007/0167165 | A1* | 7/2007 | Yang | H04W 36/0055 455/439 |
| 2008/0009291 | A1* | 1/2008 | Emberson | H04W 36/0009 455/437 |
| 2015/0189530 | A1* | 7/2015 | Nieminen | H04W 24/02 370/252 |
| 2016/0057673 | A1* | 2/2016 | Komura | H04W 36/144 370/331 |
| 2016/0081100 | A1* | 3/2016 | Du | H04W 28/12 370/329 |
| 2017/0303177 | A1* | 10/2017 | Ngounou | H04W 48/20 |
| 2018/0176284 | A1* | 6/2018 | Strater | H04L 67/04 |
| 2018/0183875 | A1* | 6/2018 | Liu | H04L 67/12 |
| 2018/0248983 | A1 | 8/2018 | Mohebbi et al. | |
| 2018/0338293 | A1 | 11/2018 | Pisharody et al. | |
| 2019/0007857 | A1* | 1/2019 | Shimoshimano | H04W 74/006 |
| 2019/0058508 | A1* | 2/2019 | Yiu | H04B 7/043 |
| 2019/0098432 | A1 | 3/2019 | Carlson et al. | |
| 2019/0245613 | A1 | 8/2019 | Roy et al. | |
| 2020/0322039 | A1* | 10/2020 | Dong | H04L 12/4641 |
| 2021/0022065 | A1* | 1/2021 | Maria | H04L 45/56 |
| 2021/0099349 | A1 | 4/2021 | Lee et al. | |
| 2022/0210720 | A1 | 6/2022 | Harada et al. | |
| 2022/0210728 | A1 | 6/2022 | Kedalagudde et al. | |
| 2022/0210777 | A1 | 6/2022 | Li et al. | |
| 2022/0210789 | A1 | 6/2022 | Bellamkonda et al. | |
| 2022/0210810 | A1 | 6/2022 | Khoshnevisan et al. | |
| 2022/0210818 | A1 | 6/2022 | Cirik et al. | |
| 2022/0210834 | A1 | 6/2022 | de la Oliva et al. | |
| 2022/0210836 | A1 | 6/2022 | Liu | |
| 2022/0210846 | A1 | 6/2022 | Cui et al. | |
| 2022/0210854 | A1 | 6/2022 | Lam et al. | |
| 2022/0210862 | A1 | 6/2022 | Cirik et al. | |
| 2022/0210869 | A1 | 6/2022 | Zhang | |
| 2022/0386185 | A1* | 12/2022 | Wang | H04W 56/001 |

* cited by examiner

SYSTEMS AND METHODS FOR SPLITTING CELLS IN A NETWORK FOR INTERNET OF THINGS (IOT)

CROSS-REFERENCE TO RELATED APPLICATIONS

This application is a divisional of U.S. patent application Ser. No. 17/397,526 filed Aug. 9, 2021, now U.S. Pat. No. 11,659,627, the content of which is relied upon and incorporated herein by reference in its entirety.

BACKGROUND

The disclosure relates generally to managing cells by controlling gateways in a network for Internet of Things (IoT), which may piggyback on another distributed communications system (DCS).

Computing devices have become ubiquitous throughout society. The explosion of the Internet and increased functions available for computing devices have caused increasing interconnection between computing devices and given rise to the Internet of Things (IoT), which may be described as the interconnection via the internet of computing devices embedded in everyday objects enabling them to send and receive data. In many cases, the data exchange is done wirelessly, giving rise to a variety of ways that the computing devices are coupled to the Internet. Popular standards include Wireless Fidelity (WiFi), Bluetooth, and Semtech's LoRa (Long Range), among others.

LoRa is a spread spectrum modulation technique derived from chirp spread spectrum (CSS) technology. In general, LoRa devices and LoRa wireless radio frequency technology is a long-range, low-power wireless platform. Semtech has promulgated the open LoRaWAN standard to enable smart IoT applications. Typically, a LoRa device wirelessly accesses the Internet through a local gateway, which communicates to an IoT application through a LoRa server. Each gateway thus acts as a cell. In many installations, uplink and downlink transmissions through the gateway are not synchronized and therefore might collide. As the number of devices within a cell grows, the likelihood of collision also grows and may reach the point where no more end devices may be added to the system without increasing the collision probability above acceptable levels. Accordingly, there is room for improved gateway management to mitigate the possibility of collision.

No admission is made that any reference cited herein constitutes prior art. Applicant expressly reserves the right to challenge the accuracy and pertinency of any cited documents.

SUMMARY

Aspects disclosed herein include systems and methods for splitting cells in a network of Internet of Things (IoT). In an exemplary aspect, a cell splitting controller function is added to an IoT network. The cell splitting controller may evaluate a network metric such as a received signal strength indicator (RSSI) for end devices to determine a general network activity level. When the network metric falls below a predetermined threshold, the cell splitting controller may cause the cell to split in such a manner as to offload some portion of the end devices on an adjacent gateway and/or change frequencies to reduce the likelihood of collision. By splitting cells in this fashion, the density of end devices served by a single gateway is reduced, fewer collisions occur statistically, and the user experience may be improved.

One exemplary embodiment of the disclosure relates to a cell split controller. The cell split controller includes an output configured to be coupled to a network connection. The cell split controller also includes a control circuit coupled to the output. The control circuit is configured to assign a first plurality of end devices to a first gateway operating using a first channel set. The control circuit is also configured to assign a second plurality of end devices to a second gateway operating using a second channel set. The control circuit is also configured to order the second plurality of end devices to operate using the second channel set.

Another exemplary embodiment of the disclosure relates to a cell split controller. The cell split controller includes an output configured to be coupled to a network connection. The cell split controller also includes a control circuit coupled to the output. The control circuit is configured to determine that a received signal strength indicator (RSSI) of an end device being served by a first gateway has fallen below a threshold. The control circuit is also configured to order the end device to switch to a new channel set of a neighboring gateway. The control circuit is also configured to check a new RSSI for the end device through the neighboring gateway. The control circuit is also configured to command the end device to switch back to an original channel set of the first gateway if the new RSSI is weaker than the received RSSI.

Another exemplary embodiment of the disclosure relates to a cell split controller. The cell split controller includes an output configured to be coupled to a network connection. The cell split controller also includes a control circuit coupled to the output. The control circuit is configured to determine a second gateway is installed proximate a first gateway serving a plurality of end devices. The control circuit is also configured to assign a subset of the plurality of end devices to the second gateway. The control circuit is also configured to assign a second channel set to the second gateway different than a first channel set assigned to the first gateway.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Aspects disclosed herein include systems and methods for splitting cells in a network of Internet of Things (IoT). In an exemplary aspect, a cell splitting controller function is added to an IoT network. The cell splitting controller may evaluate a network metric such as a received signal strength indicator (RSSI) for end devices to determine a general network activity level. When the network metric falls below a predetermined threshold, the cell splitting controller may cause the cell to split in such a manner as to offload some portion of the end devices on an adjacent gateway and/or change frequencies to reduce the likelihood of collision. By splitting cells in this fashion, the density of end devices served by a single gateway is reduced, fewer collisions occur statistically, and the user experience may be improved.

Figure 1A:
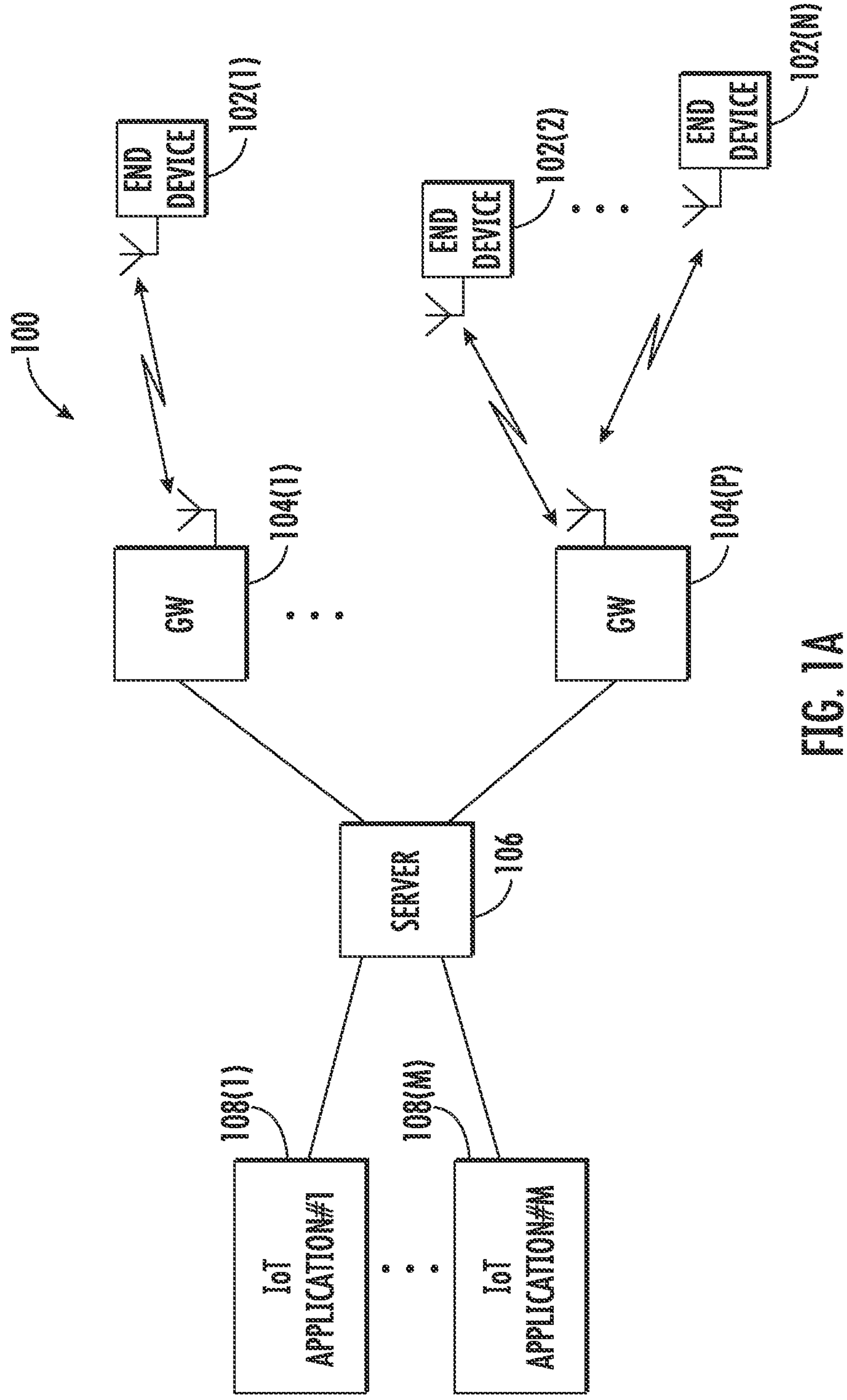
FIG. 1A is a block diagram of a conventional internet of things (IoT) network.

FIG. 1A illustrates an IoT network 100 that serves a plurality of end devices 102(1)-102(N), which may be IoT devices, and more particularly, may be Long Range (LoRa) devices according to the SEMTECH LORA WAN specification. The end devices 102(1)-102(N) communicate wirelessly with gateways 104(1)-104(P), which may be LoRa gateways. The gateways 104(1)-104(P) may communicate with a server 106, which may be local (e.g., on the gateway or in the cloud) using a wire-based or optical fiber-based communication medium. The connection between the gateways 104(1)-104(P) and the server 106 may be a local area network (LAN) or other arrangement as is well understood. The server 106 may communicate with IoT applications 108(1)-108(M). Thus, the end devices 102(1)-102(N) may communicate with the IoT applications 108(1)-108(M) passing through the gateways 104(1)-104(P) and the server 106.

Figure 1B:
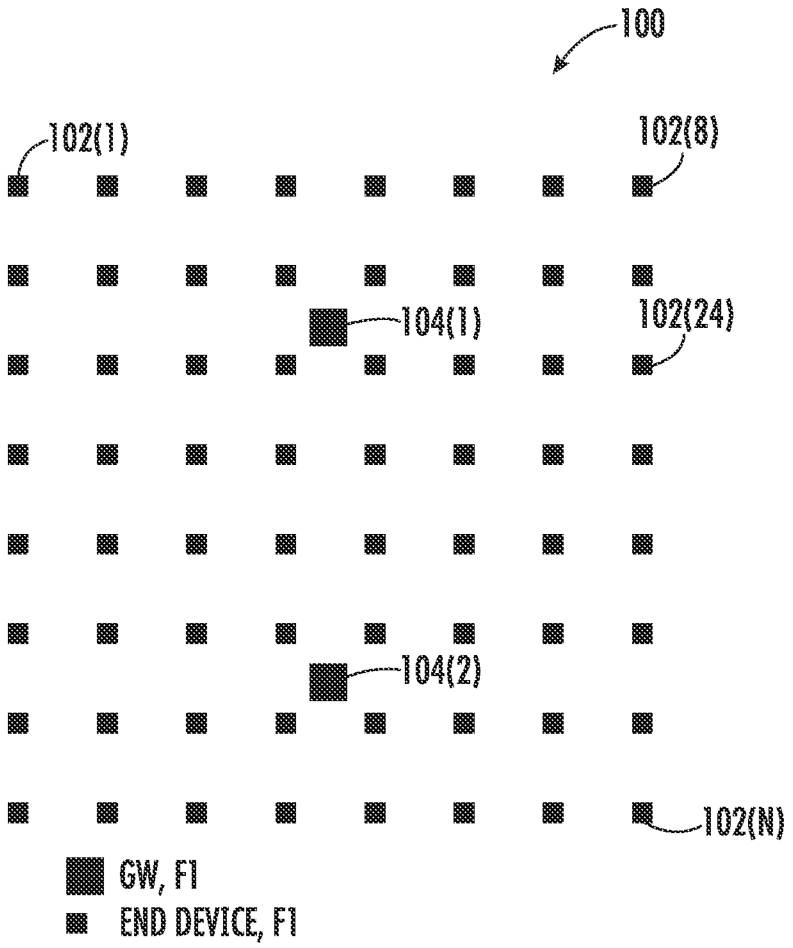
FIG. 1B is a block diagram of two adjacent gateways in the IoT network of FIG. 1A using the same frequency.

In practice, as seen in FIG. 1B, different gateways 104(1), 104(2) may be positioned proximate one another and serve many end devices 102(1)-102(N) using the same frequency (F1). Having this many end devices 102(1)-102(N) in such close proximity, all operating at the same frequency may result in collisions at one or both of the gateways 104(1), 104(2).

Figure 1C:
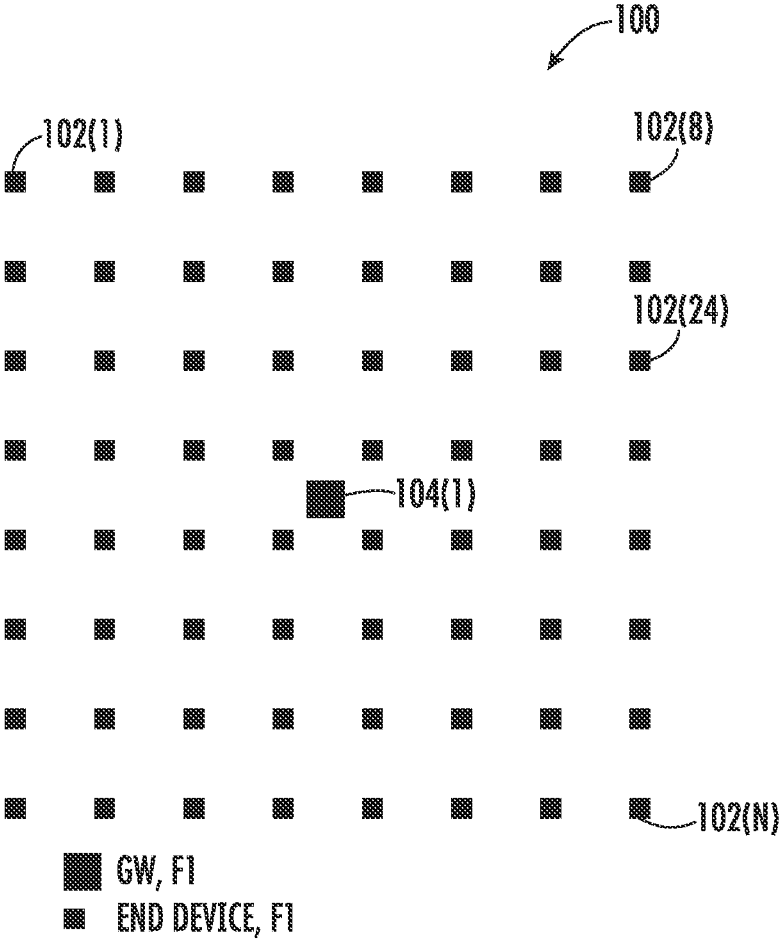
FIG. 1C is a block diagram of a single gateway in the IoT network of FIG. 1A serving multiple end devices.

Similarly, as seen in FIG. 1C, there may be instances where a single gateway 104(1) serves all the end devices 102(1)-102(N) at a single frequency. Such a situation greatly increases the likelihood of collisions, increasing latency and otherwise negatively impacting the user experience.

Exemplary aspects of the present disclosure provide systems and methods for splitting the gateways of an IoT network such that adjacent gateways may have different frequencies to create neighboring cells with different frequencies or where adjacent gateways are essentially co-located, the adjacent gateways may split the end devices and operate at different frequencies to reduce the chance of collision at the gateways.

Figure 2A:
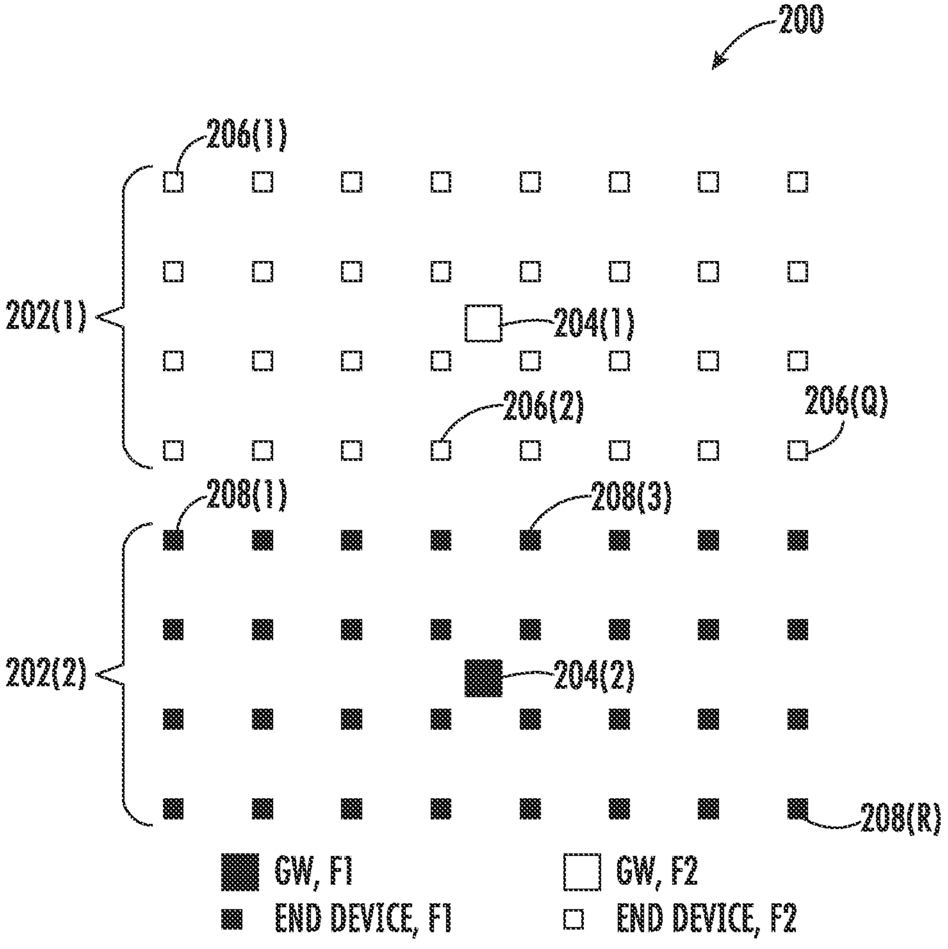
FIG. 2A is a block diagram of a frequency change instigated by a cell splitting controller according to an exemplary aspect of the present disclosure.
Figure 2B:
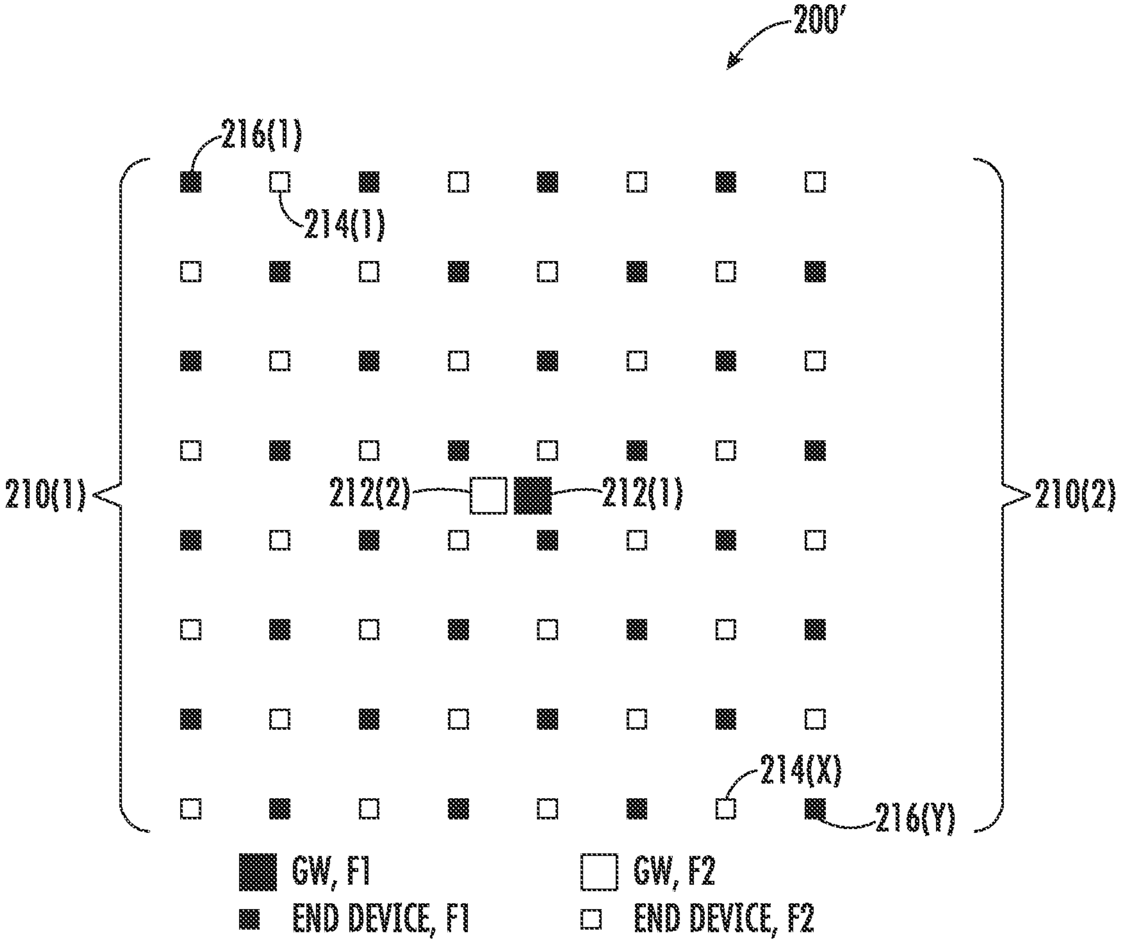
FIG. 2B is a block diagram of a gateway being split by a cell splitting controller according to an exemplary aspect of the present disclosure.
Figure 3:
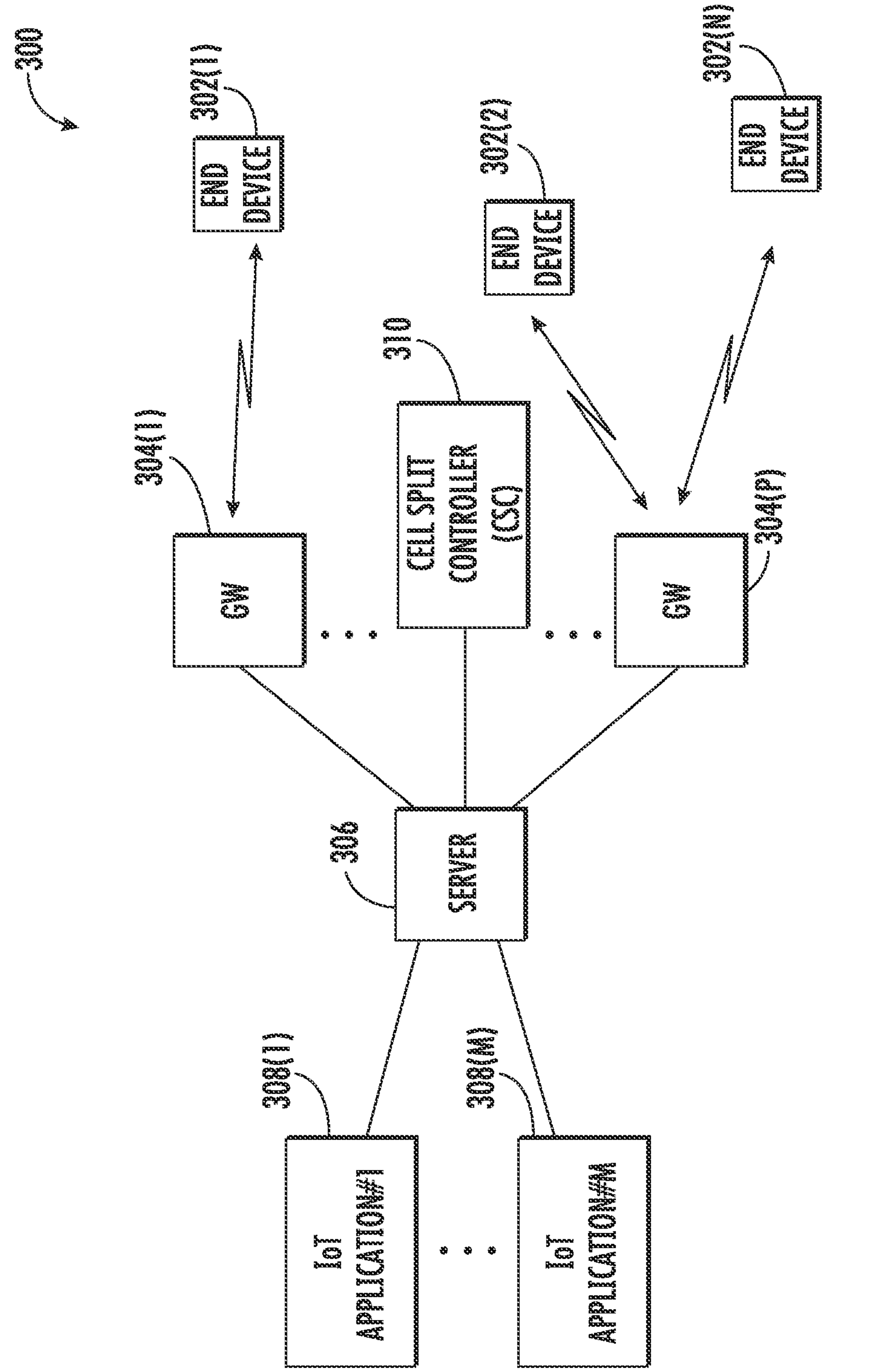
FIG. 3 is a block diagram of an IoT network having a cell splitting controller according to an exemplary aspect of the present disclosure.

FIG. 3 provides additional detail about how the cells are split, but FIGS. 2A and 2B illustrate solutions to the situations seen in FIGS. 1B and 1C, respectively. Specifically, FIG. 2A illustrates a network 200 with adjacent cells 202(1) and 202(2) served by gateways 204(1) and 204(2), respectively, where end devices 206(1)-206(Q) are served by gateway 204(1) at a first frequency (F1), and end devices 208(1)-208(R) are served by gateway 204(2) at a second frequency (F2). In this manner, a signal from an end device 206(2) may be received at the gateway 204(2) without colliding with signals from the end devices 208(1)-208(R). Similarly, a signal from an end device 208(3) may be received at the gateway 204(1) without colliding with signals from the end devices 206(1)-206(Q).

Similarly, FIG. 2B illustrates a network 200' with interleaved cells 210(1) and 210(2) served by adjacent and essentially co-located gateways 212(1) and 212(2) operating at different frequencies (F1 and F2). End devices 214(1)-214(X) are served by gateway 212(1) at a first frequency. Interleaved end devices 216(1)-216(Y) are served by gateway 212(2) at a second frequency. By allowing for different frequencies in the interleaved cells 210(1) and 210(2), the likelihood of collision is reduced even for densely populated footprints.

To effectuate the splitting of cells, exemplary aspects of the present disclosure provide a cell split controller in conjunction with elements of an IoT network. The cell split controller tests which gateways have network metrics below a predetermined threshold and causes changes in frequencies for adjacent gateways in instances where the network metric has fallen below the predetermined threshold.

In this regard, FIG. 3 illustrates an IoT network 300 that serves a plurality of end devices 302(1)-302(N), which may be IoT devices, and more particularly, may be LoRa devices. The end devices 302(1)-302(N) communicate wirelessly with gateways 304(1)-304(P), which may be LoRa gateways. The gateways 304(1)-304(P) may communicate with a server 306 using a wire-based or optical fiber-based communication medium. The connection between the gateways 304(1)-304(P) and the server 306 may be a LAN or other arrangement as is well understood. The server 306 may communicate with IoT applications 308(1)-308(M). Thus, the end devices 302(1)-302(N) may communicate with the IoT applications 308(1)-308(M) passing through the gateways 304(1)-304(P) and the server 306. A cell split controller (CSC) 310 is associated with the server 306 and provides some of the functions described herein. In an exemplary aspect, the CSC 310 may be an independent computing device that communicates with the server 306. In another aspect, the CSC 310 may be embedded in another computing device such as the server 306. The CSC 310 may include an output that is configured to communicate to the server 306 or use an output of the server 306 for communication purposes. Likewise, the CSC 310 may include a control circuit, not shown, coupled with appropriate memory to provide many of the functions described herein.

Figure 4:
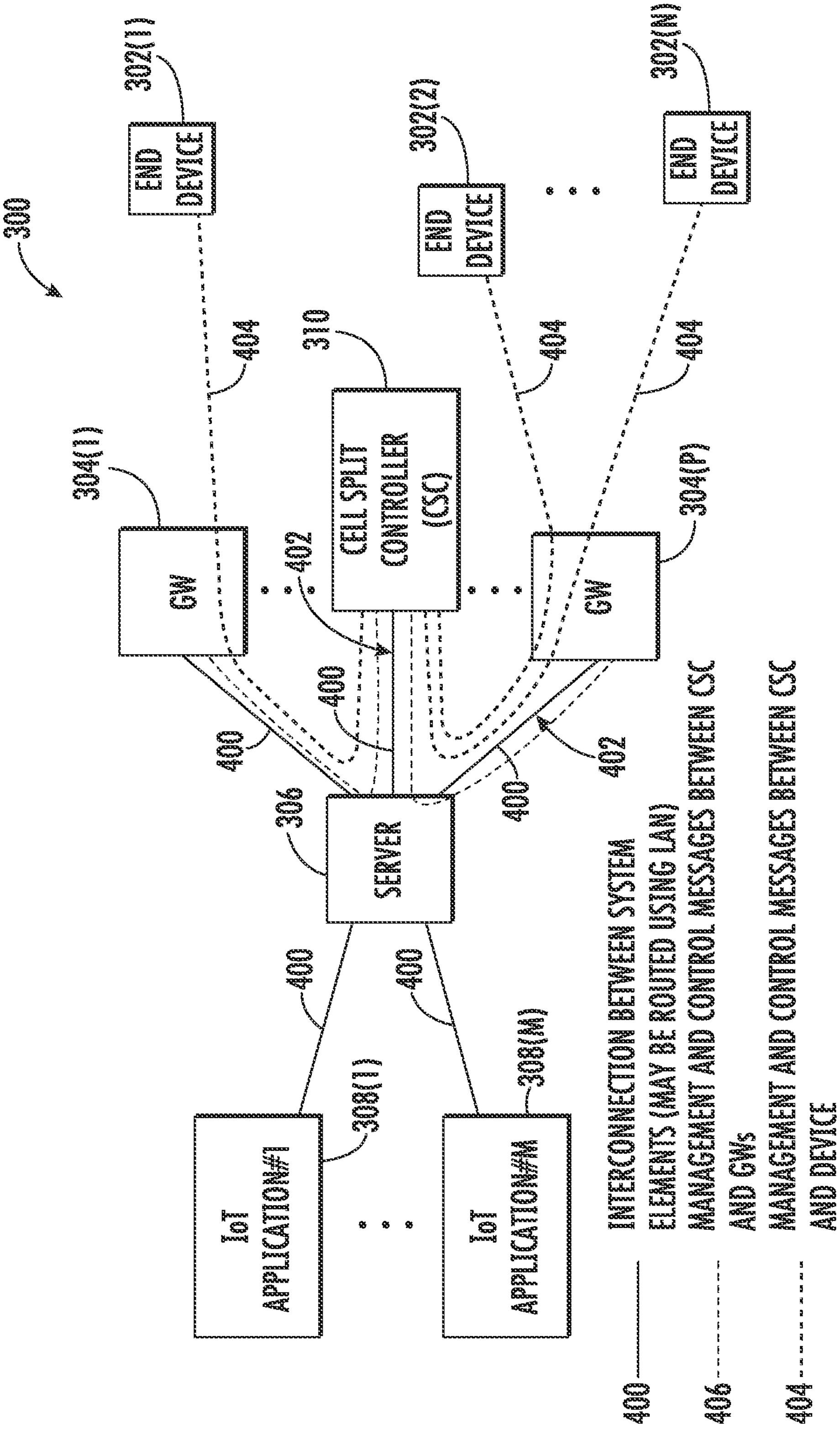
FIG. 4 is a block diagram of the IoT network of FIG. 3 with the communication paths set forth according to an exemplary aspect of the present disclosure.

With continued reference to FIG. 3, the CSC 310 may make splitting decisions based on a network metric. In an exemplary aspect, the network metric is a received signal strength indicator (RSSI). The RSSI and unique identifier for each end device 302(1)-302(N) may be provided to the CSC 310 for the decision making. FIG. 4 provides additional detail about the signaling paths for the network 300.

In this regard, FIG. 4 illustrates communication media 400 between system elements 304(1)-304(P), server 306, and IoT applications 308(1)-308(M). The communication media 400 may be a copper-based LAN, an optical fiber-based LAN, including the Internet, portions of the public switched telephone network (PSTN), or the like. Management and control messages 402 may pass across the communication media 400 and particularly pass between the CSC 310 and the gateways 304(1)-304(P). Thus, these messages 402 may be sent through the output of the CSC 310, or, if the CSC 310 is embedded in the server 306, the messages 402 may be sent using an output of the server 306. The management and control messages 402 may provide instructions to change frequencies, associate specific ones of the end devices 302(1)-302(N) with specific ones of the gateways 304(1)-304(P), handle handoffs, and the like as better explained with reference to FIGS. 5-7 below. Additionally, the CSC 310 may communicate with end devices 302(1)-302(N) using management and control messages 404, which may instruct the end devices 302(1)-302(N) about frequency changes, gateway associations, handoffs, and the like.

Figure 5:
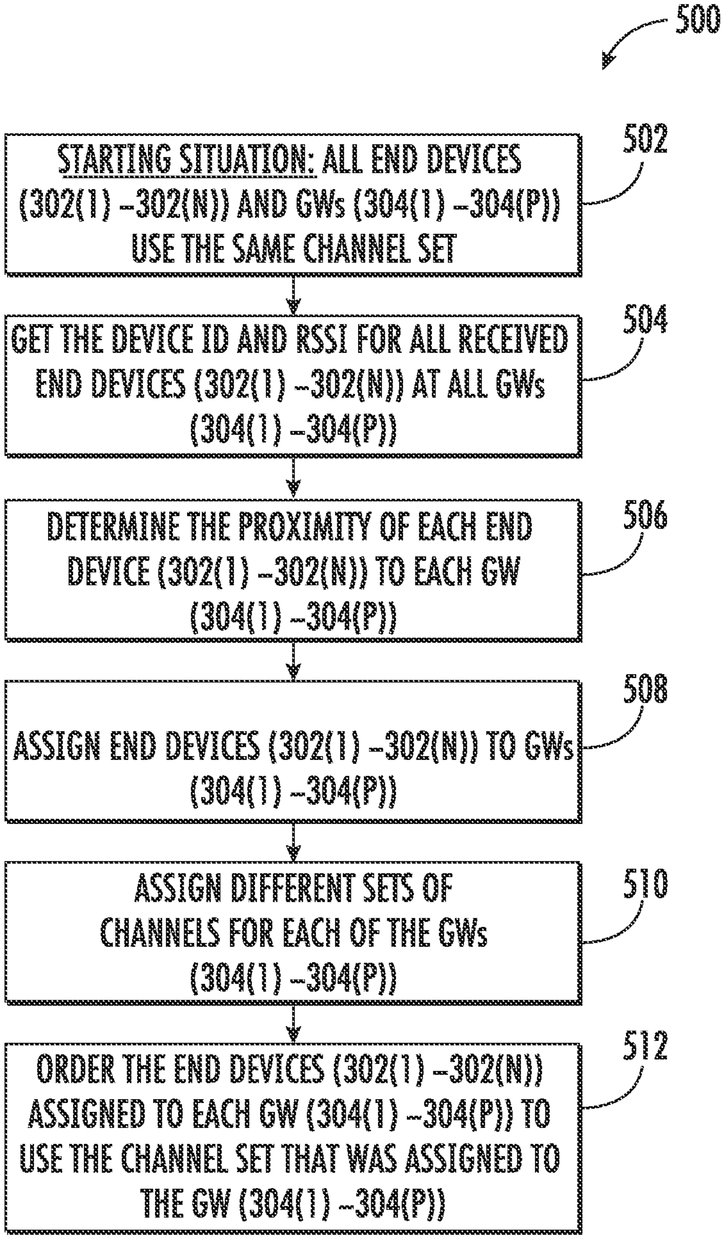
FIG. 5 is a flowchart of a process for changing frequencies to effectuate the change illustrated in FIG. 2A.
Figure 6:
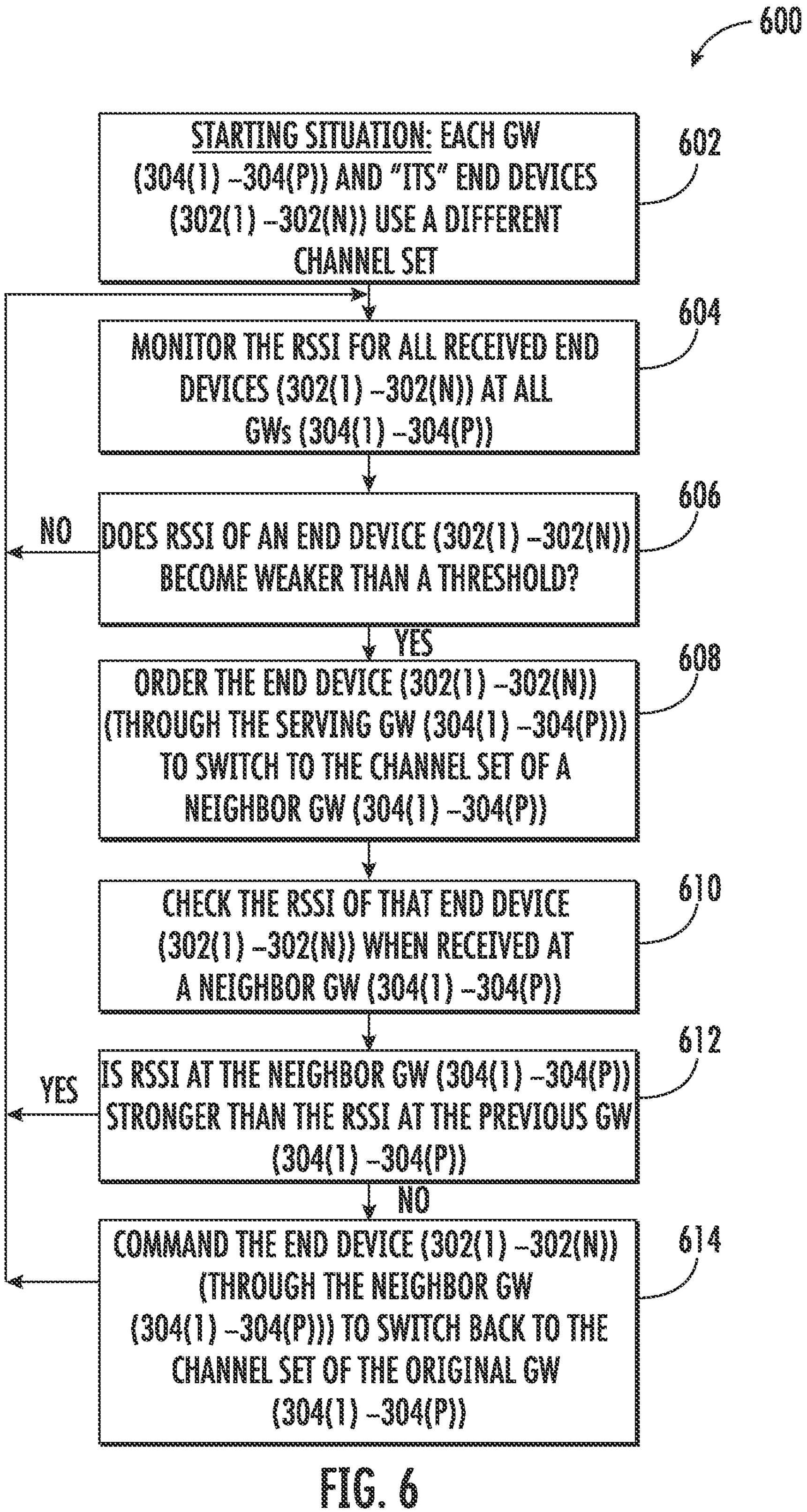
FIG. 6 is a flowchart of a process to manage end devices as they move between possible gateways in the IoT network of FIG. 3.
Figure 7:
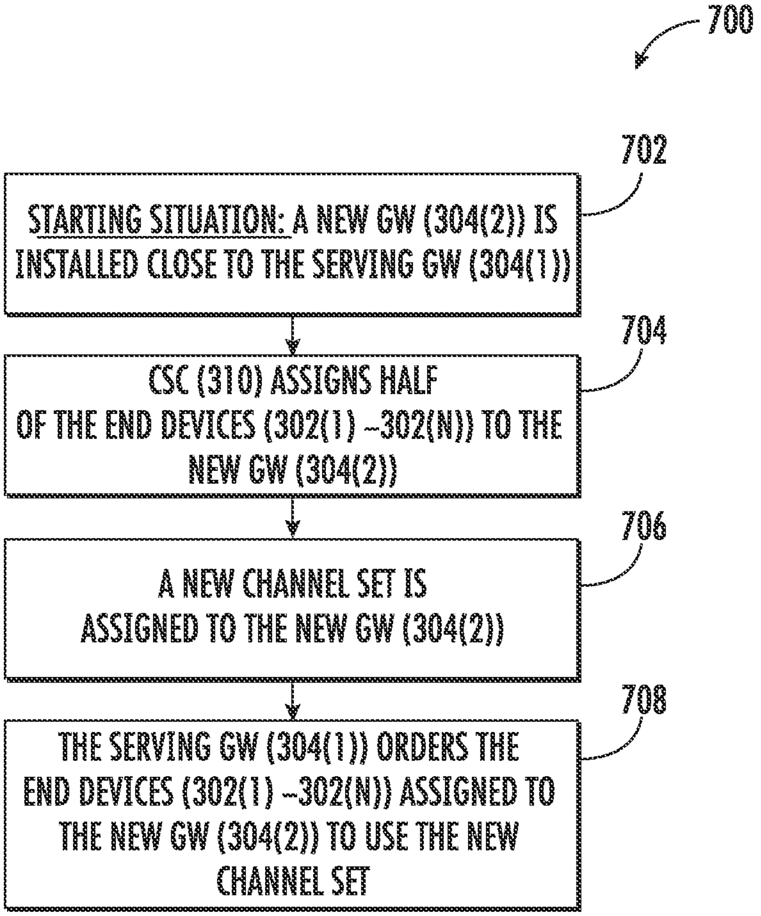
FIG. 7 is a flowchart of a process of splitting a cell when a new gateway is available, as illustrated in FIG. 2B.

Given the system 300, FIGS. 5-7 illustrate various processes associated with managing the gateways 304(1)-304(P) with the CSC 310. FIG. 5 illustrates a process 500 for a frequency change for adjacent coverage areas as illustrated in FIG. 2A. Specifically, the process 500 has a starting situation where all end devices 302(1)-302(N) and gateways 304(1)-304(P) use the same channel set (block 502) where the channel set all occurs at the same frequency range. The CSC 310 then gets the device ID and RSSI for all received end devices 302(1)-302(N) at all gateways 304(1)-304(P) (block 504). The CSC 310 may then determine the proximity of each end device 302(1)-302(N) to each gateway 304(1)-304(P) (block 506). The proximity may be determined by location information provided from the end device 302(1)-302(N), by trilateration or triangulation using multiple gateways 304(1)-304(P), by using the RSSI as a proxy for distance, or other technique as needed or desired. For example, if the end devices 302(1)-302(N) are fixed installations such as a refrigerator or other appliance that does not move, it is possible that the location of the gateways 304(1)-304(P) and the end devices 302(1)-302(N) are programmed into a table or the like in the CSC 310 at system creation/installation.

With continued reference to FIG. 5, the process 500 continues with the CSC 310 assigning the end devices 302(1)-302(N) to gateways 304(1)-304(P) (block 508), for example, based on proximity. The CSC 310 further assigns different sets of channels for each of the gateways 304(1)-304(P) (block 510) with the understanding that each set of channels may be on a different frequency. The CSC 310 then orders the end devices 302(1)-302(N) assigned to each gateway 304(1)-304(P) to use the channel set that was assigned to the respective one of the gateways 304(1)-304(P) (block 512). Process 500 effectively splits the cell illustrated in FIG. 1B and makes it look like the cell(s) illustrated in FIG. 2A.

Similarly, FIG. 6 illustrates a process 600 for testing a handoff between gateways 304(1)-304(P) as an end device 302(1)-302(N) moves. The process 600 has a starting situation where each gateway 304(1)-304(P) and its associated end devices 302(1)-302(N) use a different channel set (block 602) than other gateways and their associated end devices. The CSC 310 monitors the RSSI for all received end devices 302(1)-302(N) at all gateways 304(1)-304(P) (block 604) to determine if the RSSI of an end device 302(1)-302(N) becomes weaker than a threshold (block 606). If the answer is no, then the end devices 302(1)-302(N) are not moving enough to necessitate a change, and the process returns to the starting condition. If, however, the answer to block 606 is yes, an RSSI of an end device 302(1)-302(N) has become weaker than a threshold, then the CSC 310 orders the end device 302(1)-302(N) (through the serving gateway 304(1)-304(P)) to switch the channel set of a neighbor gateway 304(1)-304(P) (block 608).

With continued reference to FIG. 6, the CSC 310 then checks the RSSI of that end device 302(1)-302(N) when received at the neighbor gateway 304(1)-304(P) (block 610) and determines if the RSSI at the neighbor gateway 304(1)-304(P) is stronger than the RSSI at the previous gateway 304(1)-304(P) (block 612). If the answer to block 612 is yes, then the process 600 leaves the end device 302(1)-302(N) with the neighbor gateway 304(1)-304(P) and returns to the starting condition. If, however, the answer to block 612 is no, the RSSI is not stronger than the previous RSSI, then the CSC 310 commands the end device 302(1)-302(N) (through the neighbor gateway 304(1)-304(P)) to switch back to the channel set of the original gateway 304(1)-304(P) (block 614). Note that if the two gateways (original and neighbor) have comparable RSSI, the end device 302(1)-302(N) may toggle or switch back and forth between the gateways. To avoid such toggling, the end device 302(1)-302(N) or the original gateway 304(1)-304(P) may prevent a subsequent switch unless the neighbor gateway has an RSSI stronger than the original gateway by some threshold dBs. The original gateway may solicit this information from the end device 302(1)-302(N).

FIG. 7 illustrates a process 700 that may occur when a new gateway is installed and may be, for example, co-located with an initial gateway. The process 700 corresponds to the system illustrated in FIG. 2B compared to the system illustrated in FIG. 1C. The process 700 begins with a starting situation of a new gateway 304(2) is installed close to the serving gateway 304(1) (block 702). The CSC 310 assigns half of the end devices 302(1)-302(N) to the new gateway 304(2) (block 704). If N is an odd number, then the CSC 310 may determine which gateway 304(1) or 304(2) receives the "extra" end device 302. The CSC 310 causes a new channel set to be assigned to the new gateway 304(2) (block 706) that is different than the channel set used by the original or serving gateway 304(1). The serving gateway 304(1) orders the end devices 302(1)-302(N) assigned to the new gateway 304(2) to use the new channel set (block 708).

Figure 8A:
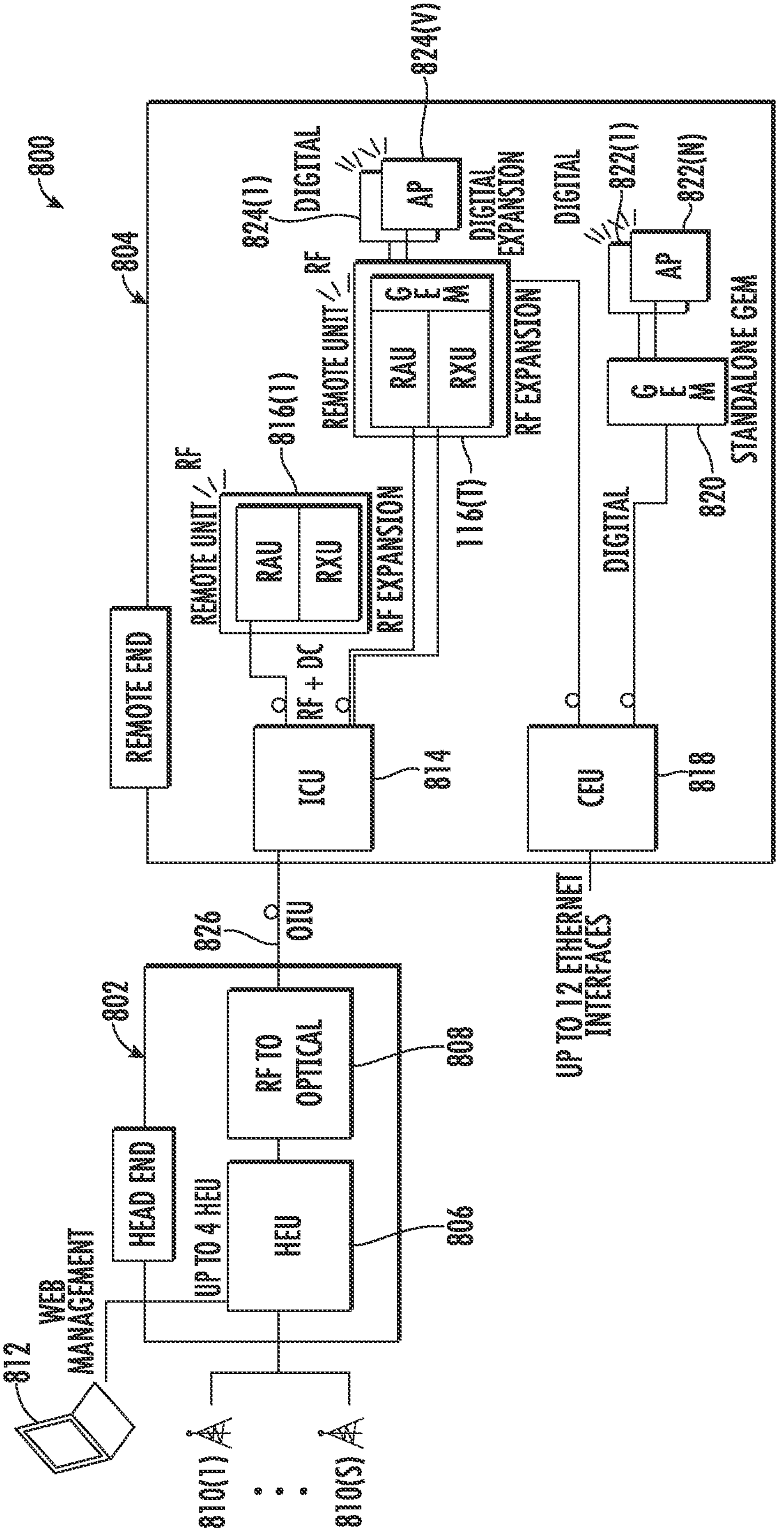
FIG. 8A is a block diagram of a distributed communication system (DCS) on which the IoT network of FIG. 3 may be piggybacked.
Figure 8B:
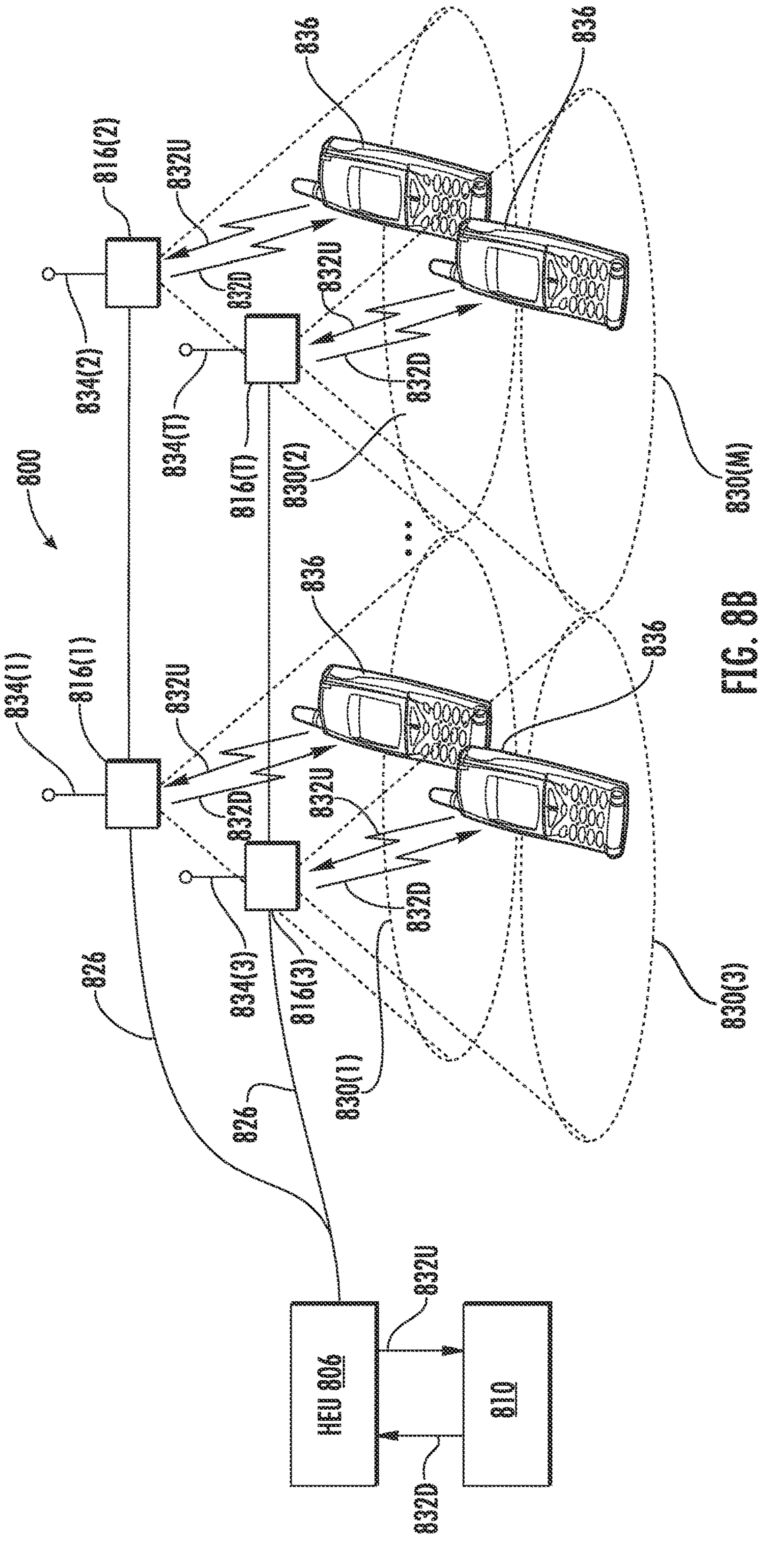
FIG. 8B is a schematic diagram of the DCS of FIG. 8A showing coverage areas and remote units on which the IoT network may be piggybacked.
Figure 8C:
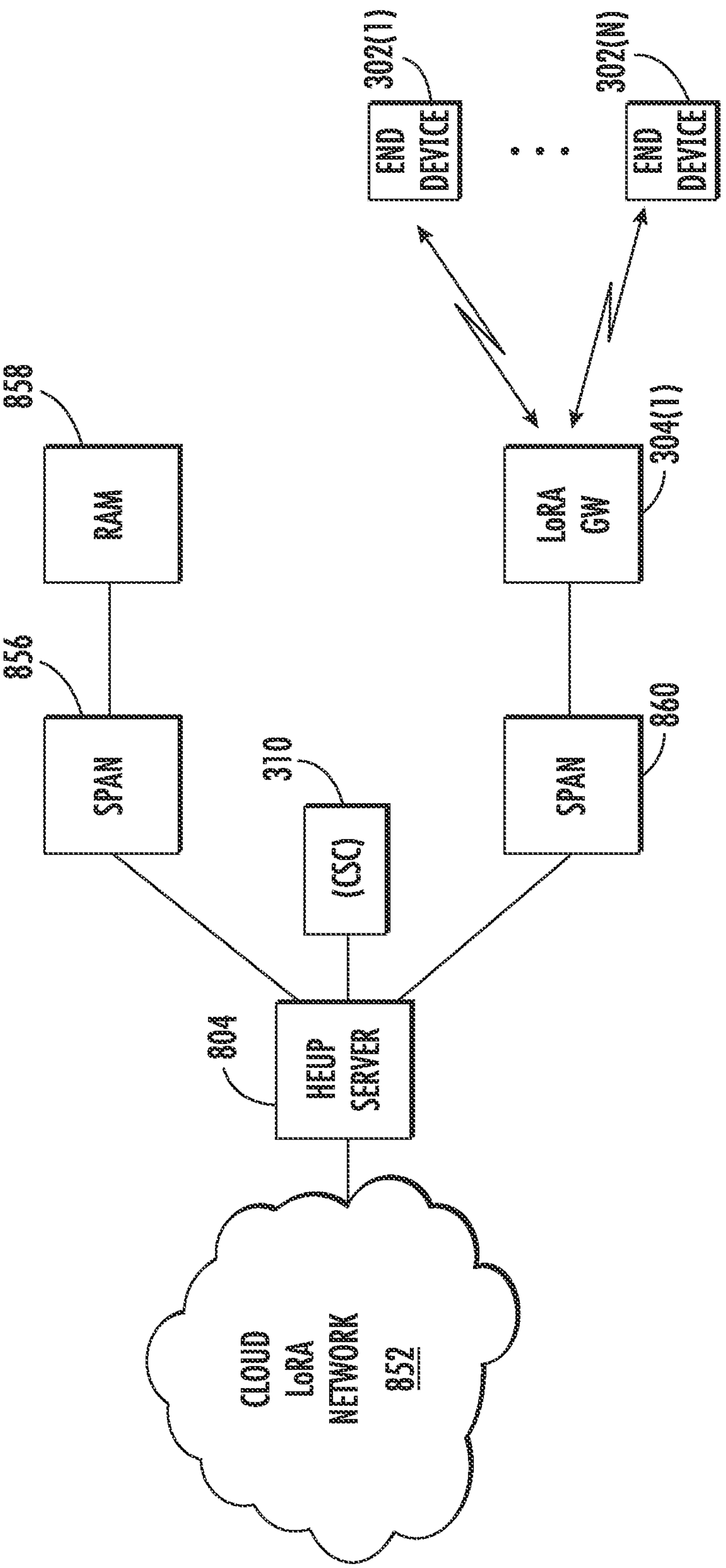
FIG. 8C is a block diagram of a software-defined DCS with which the IoT network of FIG. 3 may interoperate.

While it should be appreciated that the network 300 may exist in isolation, it is also possible that the network 300 may piggyback on top of a distributed communication system (DCS) such as a distributed antenna system (DAS), illustrated in FIGS. 8A and 8B or a software defined area network (SDAN) illustrated in FIG. 8C.

FIG. 8A illustrates a distributed antenna system (DAS) 800 having a head end 802 and a remote end 804. The head end 802 may include one or more head end units (HEUs) 806 (although typically no more than four (4) are present). The HEU 806 may include the server 306 of network 300. The HEU 806 may be coupled to respective radio frequency (RF) to optical (RF-to-O) conversion units 808 (only one shown). The RF-to-O conversion unit 808 may sometimes be referred to as an optical interface module. The HEU 806 may further be coupled to one or more RF services 810(1)-810(S) (generically RF service 810). Typically, up to twelve (12) RF services 810 may be coupled to a given HEU 806, so if there are four HEUs 806, N may be forty-eight (48). An RF service 810 may be a cellular service provider (e.g., AT&T, VERIZON) or the like, and a given provider may have multiple services depending on technologies (4G vs. 5G), frequency bands, or the like. The HEU 806 may further be connected to a computer 812, which in an exemplary aspect is a web management computer. The server 306, or gateway 304(1)-304(P) may reside within the HEU 806.

With continued reference to FIG. 8A, the remote end 804 may include the gateway 304 of network 300. Further, the remote end 804 may include an interconnect unit (ICU) 814 coupled to one or more remote units (RUs) 816(1)-816(T). More specifically, one or more of the RUs 816(1)-816(T) may include the gateway 304. Further, the remote end 804 may include a centralized ethernet unit (CEU) 818 that may connect to one or more Ethernet interfaces, although typically no more than twelve (12) are so coupled (not shown explicitly). The CEU 818 may couple to at least one RU 816(T) as well as a gigabit ethernet unit (GEM) 820. The GEM 820 may connect to a plurality of access points (APs) 822(1)-822(U). Additionally, at least one RU 816(T) may connect to a second plurality of APs 824(1)-824(Q). In an exemplary aspect, the APs 822(1)-822(U), 824(1)-824(V) provide digital signals while the RUs 816(1)-816(T) provide analog RF signals.

The head end 802 may be coupled to the remote end 804 via an optical interface unit (OIU) 826, such as one or more fiber optic cables. It is possible that instead of being in the HEU 806, the gateways 304(1)-304(P) may be located within the RUs 816(1)-816(T) and use the DAS 800 to connect to a local server 306 within the HEU 806 or in the cloud.

FIG. 8B illustrates the DAS 800 in operation and configured to distribute communication services to remote coverage areas 830(1)-830(T). The DAS 800 can be configured to support a variety of communication services that can include cellular communication services, wireless communication services, such as RF identification (RFID) tracking, Wireless Fidelity (WiFi), local area network (LAN), and wireless LAN (WLAN), wireless solutions (Bluetooth, WiFi Global Positioning System (GPS) signal-based, and others) for location-based services, and combinations thereof, as examples. The remote coverage areas 830(1)-830(T) are created by and centered on the RUs 816(1)-816(T) connected to a central unit, which may be the head end unit 806. The head end unit 806 may be communicatively coupled to a component of an RF service 810, such as, for example, a base transceiver station (BTS) or a baseband unit (BBU). In this regard, the head end unit 806 receives downlink communication signals 832D from the RF service 810 to be distributed to the RUs 816(1)-816(T). The downlink communication signals 832D can include data communication signals and/or communication signaling signals as examples. The head end unit 806 may be configured with filtering circuits and/or other signal processing circuits that are configured to support a specific number of communication services in a particular frequency bandwidth (i.e., frequency communication bands). The downlink communication signals 832D are communicated by the head end unit 806 over the OIU 826 to the RUs 816(1)-816(T).

With continuing reference to FIG. 8B, the RUs 816(1)-816(T) are configured to receive the downlink communication signals 832D from the head end unit 806 over the OIU 826. The downlink communication signals 832D are configured to be distributed to the respective remote coverage areas 830(1)-830(T) of the RUs 816(1)-816(T). The RUs 816(1)-816(T) are also configured with filters and other signal processing circuits that are configured to support all or a subset of the specific communication services (i.e., frequency communication bands) supported by the head end unit 806. Each of the RUs 816(1)-816(T) may include an RF transmitter/receiver (not shown explicitly) and a respective antenna 834(1)-834(T) operably connected to the RF transmitter/receiver to distribute wirelessly the communication services to user equipment (UE) 836 within the respective remote coverage areas 830(1)-830(T). The RUs 816(1)-816(T) are also configured to receive uplink communication signals 832U from the UE 836 in the respective remote coverage areas 830(1)-830(T) to be distributed to the RF service 810.

While a DAS such as DAS 800 may have the network 300 associated or integrated therewith, another option would be a software defined area network (SDAN) 850 such as illustrated in FIG. 8C. The SDAN 850 may be associated with a cloud 852, which includes one or more IoT applications (not illustrated) that functions as part of a LORA network. An HEU 854 may include the server 306 (and optionally the CSC 310, although the CSC 310 may be external thereto, as illustrated). A first SDAN 856 may be associated with remote antenna units 858. A second SDAN 860 may be associated with a gateway 304(1) for communication with end devices 302(1)-302(N).

Figure 9:
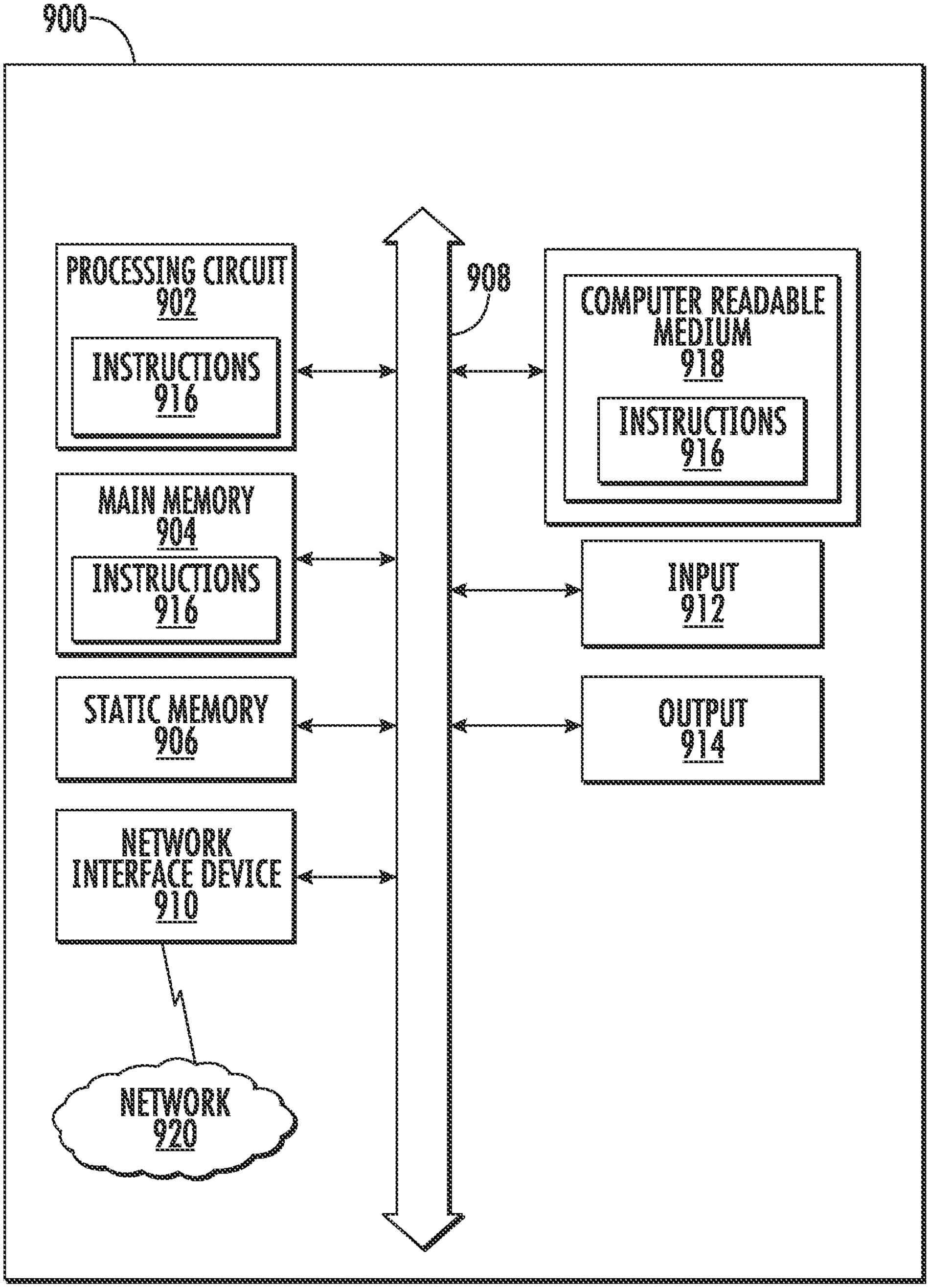
FIG. 9 is a schematic diagram of a representation of an exemplary computer system that can be included in or interfaced with any of the components in the IoT network of FIG. 3, wherein the exemplary computer system is configured to execute instructions from an exemplary computer-readable medium.

Any of the circuits in the network 300 of FIG. 3 such as the CSC, server, gateway, or the like, can include a computer system 900, such as that shown in FIG. 9, to carry out their functions and operations. With reference to FIG. 9, the computer system 900 includes a set of instructions for causing the multi-operator radio node component(s) to provide its designed functionality and the circuits discussed above. The multi-operator radio node component(s) may be connected (e.g., networked) to other machines in a LAN, an intranet, an extranet, or the Internet. The multi-operator radio node component(s) may operate in a client-server network environment or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The multi-operator radio node component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server, edge computer, or a user's computer. The exemplary computer system 900 in this embodiment includes a processing circuit or processor 902 (which may be, for example, the control circuit of the CSC 310), a main memory 904 (e.g., read-only memory (ROM), flash memory, dynamic random access memory (DRAM) such as synchronous DRAM (SDRAM), etc.), and a static memory 906 (e.g., flash memory, static random access memory (SRAM), etc.), which may communicate with each other via a data bus 908. Alternatively, the processing circuit 902 may be connected to the main memory 904 and/or static memory 906 directly or via some other connectivity means. The processing circuit 902 may be a controller, and the main memory 904 or static memory 906 may be any type of memory.

The processing circuit 902 represents one or more general-purpose processing circuits such as a microprocessor, central processing unit, or the like. More particularly, the processing circuit 902 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing circuit 902 is configured to execute processing logic in instructions 916 for performing the operations and steps discussed herein.

The computer system 900 may further include a network interface device 910. The computer system 900 also may or may not include an input 912 to receive input and selections to be communicated to the computer system 900 when executing instructions 916. The computer system 900 also may or may not include an output 914, including, but not limited to, a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processing circuit 902 during execution thereof by the computer system 900, the main memory 904, and the processing circuit 902 also constituting the computer-readable medium 918. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database and/or associated caches and servers) that store the one or more sets of instructions 916. The term "computer-readable medium" shall also be taken to include any medium that is capable of storing, encoding, or carrying a set of instructions for execution by the processing circuit and that cause the processing circuit to perform any one or more of the methodologies of the embodiments disclosed herein. The term "computer-readable medium" shall accordingly be taken to include, but not be limited to, solid-state memories, optical and magnetic medium, and carrier wave signals.

Note that as an example, any "ports," "combiners," "splitters," and other "circuits" mentioned in this description may be implemented using Field Programmable Logic Array(s) (FPGA(s)) and/or a digital signal processor(s) (DSP(s)), and therefore, may be embedded within the FPGA or be performed by computational processes.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product or software that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read-only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware and may reside, for example, in Random Access Memory (RAM), flash memory, Read-Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modification combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A cell split controller comprising: an output configured to be coupled to a network connection; and a control circuit coupled to the output, the control circuit configured to:

determine that a received signal strength indicator (RSSI) of an end device being served by a first gateway has fallen below a threshold;

order the end device to switch to a new channel set of a neighboring gateway;

check a new RSSI for the end device through the neighboring gateway; and command the end device to switch back to an original channel set of the first gateway if the new RSSI is weaker than the RSSI.

2. The cell split controller of claim 1, wherein the control circuit is further configured to compare the new RSSI to the RSSI.

3. The cell split controller of claim 1, wherein the first gateway comprises a Long Range (LoRa) gateway.

4. The cell split controller of claim 1, wherein the control circuit is integrated into a LoRa server.

5. The cell split controller of claim 1, wherein the output is configured to be coupled to a software defined area network (SDAN).

6. The cell split controller of claim 1, wherein the control circuit is configured to command LoRa end devices.

* * * * *